Sept. 24, 1935.  A. W. BRUCE  2,015,058
PROCESS OF TREATING ANIMALS
Filed Oct. 17, 1932
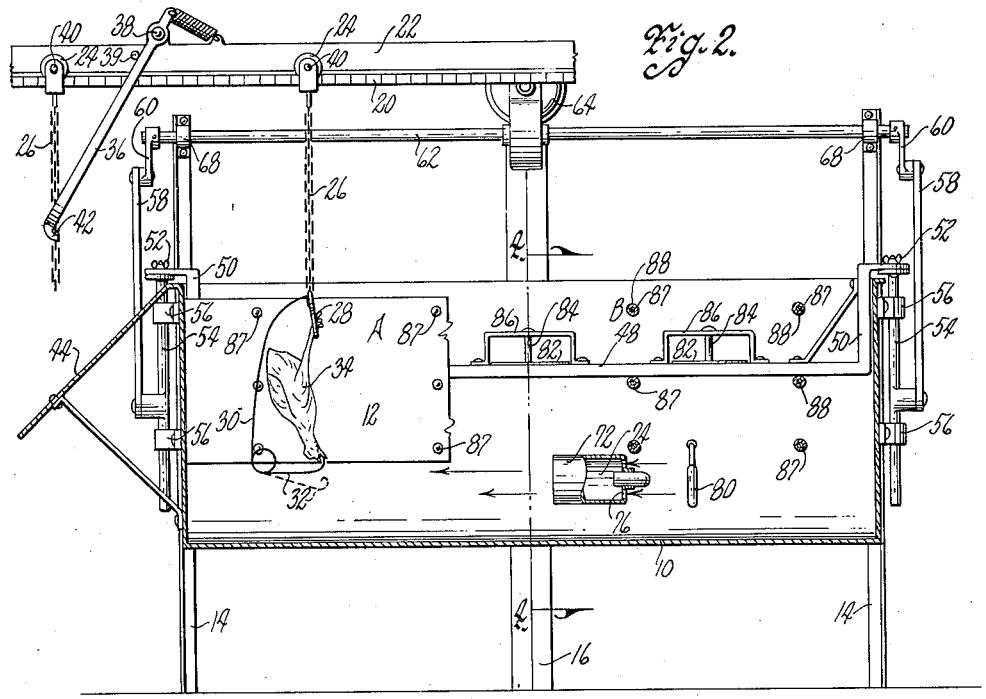

Patented Sept. 24, 1935

2,015,058

UNITED STATES PATENT OFFICE 2,015,058

PROCESS OF TREATING ANIMALS

Albert W. Bruce, Ottumwa, Iowa

Application October 17, 1932, Serial No. 638,101

10 Claims. (Cl. 17—45)

An object of my invention is to provide a process for treating animals and particularly for preparing fowls for picking or defeathering which effectively permits the scalding water to effectively penetrate the feathers and contact with the skins of the fowls so as to thoroughly soak their skins and thus render their feathers readily removable, the process being adapted for either slack or hard scalding and being also suitable for preparing animals for dehairing.

A further object is to provide a process of preparing fowls for picking consisting in the submerging or suspending of the fowls in a body of scalding water and subjecting the body of water to alternate movement in an up-and-down direction relative to the fowls so that the water when moving downwardly will enter the feathers against their lay and when moving upwardly will again enter the feathers and tend to move any of them which might have had their lay reversed by the downwardly moving water, to their original lay, the alternate movement of the water in opposite directions serving to effectively force it to penetrate the feathers in the most effective manner to reach the skins of the fowls for preparing them for picking.

Still a further object is to provide a process of preparing fowls for picking consisting of suspending the fowls head-down and maintaining them stretched in a body of water and subjecting the body of water to alternate up-and-down movement while the fowls are so suspended therein.

Still a further object is to provide a process of preparing fowls for picking consisting of heating a body of water at one point and causing it to alternately move in opposite directions relative to the fowls at another point, while at the same time, circulating the water to keep the temperature thereof at a uniform degree throughout the entire body of water.

With these and other objects in view, my invention consists in the practice of my process whereby the objects contemplated are attained as hereinafter more fully set forth and pointed out in my claims, the accompanying drawing illustrating an apparatus which can be used in the practice of the process.

With reference to the drawing, Figure 1 is a plan view of a slack or hard scalding machine which can be used in the practice of my process.

Figure 2 is a sectional view of the same on the line 2—2 of Figure 1.

Figure 3 is an end elevation of the left end of Figure 2.

Figure 4 is a sectional view on the line 4—4 of Figure 2; and

Figure 5 is a sectional view of a part of Figure 4 showing the parts and the body of water in the scalding water container in a different operative position.

The machine illustrated, which can be used for practising my process, includes a tank 10 having a central longitudinal partition 12. The upper edge of the partition 12 terminates slightly below the top of the tank 10 and the lower edge thereof terminates a substantial distance above the bottom of the tank, as shown in Figure 4. The tank 10 is suitably supported by legs 14.

Within the tank 10, a body of water 18 is contained, this water being of the proper temperature for slack scalding fowls. The partition 12 divides the tank 10 into compartments A and B. Over the compartment A, a conveyor chain 20 is mounted. It is supported on a track 22 by rollers 24 from which chains 26 are suspended at intervals.

Each chain 26 has a shackle 28 secured to the lower end thereof. The shackle 28 is of special construction inasmuch as it has an extension 30 terminating in a spring hook 32. The feet of a fowl 34 are adapted to be engaged in the shackle 28 and the hook 32 is adapted to engage in the fowl's mouth, the resilience of the arm 30 tending to minimize the muscular movement of the fowl and thereby maintain it in stretched position so that it cannot flop around in the body of water 18 and thereby cause itself to assume a floating position preventing a proper scald, but will remain submerged.

The conveyor chain 20 is adapted to convey the fowls 34 successively through the compartment A for slack scalding them therein. An automatic accelerating arm 36 is shown pivoted at 38 and normally spring retained in one position against a stop 39. When a pin 40 of any given pulley 24 engages a portion 36a of the arm 36, it will cause a hook 42 on the lower end of the arm to engage the chain 26 and quickly position the fowl in the tank so that the scalding process can start at the extreme entering end of the tank instead of part way along the tank as would be the case if the fowl were merely dragged into the tank. The tank has an entrance platform 44 to facilitate entry of the fowl into the tank and a similar exit platform 46 can be provided. Although I have not shown an arm 36 for removing the fowl from the tank, this can be provided if desired.

My process involves subjecting the body of water 18 to alternate movement in opposite directions longitudinally of the fowl. To accomplish this, I provide a vertically reciprocable piston plate 48. It is mounted in the compartment B, the sides of the compartment serving as a cylinder for it. The piston 48 has upwardly directed extensions 50 connected by bolts and wing nuts 52 to guide rods 54. The rods 54 are vertically slidable in bearings 56.

For reciprocating the piston 48, I provide connecting rods 58, crank arms 60 and a crank shaft 62 driven by a suitable step-down gearing from an electric motor 64 or other power means. The step-down gearing is indicated generally by the reference numeral 66 and can be of the worm and worm gear type. The motor 64 and the gearing 66 can be supported on the supporting legs 16, while bearings 68 may be provided on the legs 14 for journalling the crank shaft 62.

It will be obvious that reciprocation of the piston 48 in the compartment B will cause alternate up-and-down movement of the body of water in the compartment A. For instance, in Figure 4, the piston is traveling downwardly and the body of water in the compartment A is traveling upwardly and tending to penetrate the feathers of the fowl, although also tending to cause them to lie in their natural position, in which they tend to prevent the entrance of the water into the feathers.

When the piston 48 travels upwardly, however, the water will be spilled over the partition 12 from the compartment B into the compartment A and the movement of the water in the compartment A will be downward, tending to reverse the lay of the feathers of the fowl, as indicated in Figure 5. During the reversing process, some of the water gets into the feathers and as the piston reciprocates, the feathers are worked first in one direction and then in the other, with the result that the water in flowing past the fowl effectively penetrates the feathers and thoroughly soaks the skin of the fowl to facilitate removal of the feathers therefrom.

The water must be kept at a predetermined temperature in order to get the best results. I have shown a steam pipe 70 terminating in a nozzle 72 within the tank 10. A cylinder 74 surrounds the nozzle 72 and is perforated as indicated at 76, the result being that when steam is discharged from the nozzle 72, the water is circulated through the openings 76 and the cylinder 74, as shown by arrows in Figure 2, for evenly distributing the steam through the water to thus evenly heat the water.

The supply of steam is preferably automatically controlled by a valve 78 of the thermo-responsive type, a bulb 80 being subjected to the temperature of the water for automatically controlling the position of the valve stem in the ordinary manner.

The type of steam nozzle 72 produces a horizontal circulation but no vertical circulation for heating the water above the nozzle. Means is provided for causing the piston 48 to do this however, and such means consists of a plurality of check valves 82 slidable on pins 84 carried by yokes 86 and normally covering openings 83. The yokes in turn are carried by the piston. In the downward movement of the piston, as shown in Figure 4, the check valves 82 open so that a less volume of water is forced down by the piston 48 than is forced up when the check valve closes as in Figure 5. The result is a slight spilling of water as at 18a or no spilling at all from the compartment A to the compartment B, as shown in Figure 4, with maximum spilling as at 18b from the compartment B to the compartment A as shown in Figure 5. Thus the body of water gradually circulates in a clockwise direction for keeping the temperature throughout at the same degree. This direction of circulation is preferable because it causes a greater volume of water to be directed opposite the lay of the feathers than is directed with their lay.

The sizes and number of the check valves can be changed so as to procure more or less circulation, as desired, which in no way interferes with the alternate up-and-down rocking motion of the water past the fowl. Since the piston 48 extends throughout the length of the tank 10, the same rocking motion is imparted to the entire body of water to give the same alternate movement of the water for a fowl at any position throughout the length of the tank.

The tank 10 and the partition 12 may be made of sheet metal and to prevent undue bowing thereof on account of the pressure of the water, especially as produced by the movement of the piston 48, tie rods 87 and spacer tubes 88 may be provided.

In describing the operation of my machine, the process also has been fully described because it consists in alternately moving the body of water longitudinally relative to the fowl in opposite directions. This works the water into the feathers for obtaining a most complete scald on the fowl.

Although I have described a process for treating fowls and have illustrated a machine adapted to handle fowls according to the process, the process is equally adaptable for treating animals for dehairing. They can be suspended in the body of water and the alternate up and down motion thereof effectively cause entry of the water through the hair of the animal to its skin for treating the skin to facilitate removal of the hair.

Some changes may be made in the actual steps of the process and many different types of machines could be used for practising the process without deviating from the real spirit and purpose of my invention. It is therefore my intention to cover by my claims such modified steps of the process as would be reasonably included within their scope.

I claim as my invention:—

1. A process of preparing animals consisting in suspending the animals and positively retaining them stretched to minimize their muscular movement in a body of water and rapidly moving the body of water alternately in opposite vertical directions.

2. A process of treating fowls for defeathering consisting in submerging the fowls in a body of water and holding them stretched therein to minimize their muscular movement and subjecting the body of water to rapid alternate movement in opposite directions longitudinally of the fowls to force the water through their feathers to their skins.

3. A process of treating animals consisting in conveying the animals at a given speed, submerging them in a body of water at one point in their travel, rapidly moving the body of water in alternately opposite directions longitudinally relative to said animals at a substantially greater speed and extracting the animals from said body of water.

4. A process of treating animals consisting in relatively slowly conveying the animals longitudinally relative to a tank having a body of water therein, submerging them in said body of water at one end of said tank, conveying them to the other end of said tank, relatively rapidly moving the body of water in alternately opposite directions longitudinally relative to the animals and extracting the animals from the tank when they reach said other end thereof.

5. A process of preparing animals for the purpose disclosed consisting in conveying the animals at a predetermined speed, submerging them in a body of water at one point in their travel, moving the body of water in alternately opposite directions longitudinally relative to said animals and at a much greater speed than the speed of conveying, producing a constant current in said body of water during the alternate movement thereof and extracting the animals from said body of water.

6. A process of preparing animals for the purpose disclosed consisting in conveying the animals, submerging them in a body of water at one point in their travel and maintaining them in stretched position, moving the body of water at a relatively greater speed than the speed of conveying and in alternately opposite directions longitudinally relative to said animals and extracting the animals from said body of water.

7. A process of preparing animals consisting in suspending them by their feet in a body of water, subjecting the body of water to rapid alternate up-and-down movement and also maintaining circulation of the water between the upper and lower parts of the body thereof while subjecting it to such alternate movement.

8. A process of treating fowls prior to picking their feathers consisting in suspending them by their feet and maintaining them positively stretched while so suspended in a body of water to minimize their muscular movement and subjecting the body of water to rapid alternate up-and-down movement.

9. A process of treating fowls prior to picking their feathers consisting in suspending them by their feet in a body of water, subjecting the body of water to rapid alternate up-and-down movement and circulating the water in a direction opposite the lay of the feathers of the fowls while subjecting it to such alternate movement.

10. A process of slack scalding fowls consisting of submerging them in a body of water in a tank, and rapidly moving the body of water in alternately opposite directions substantially against and substantially with the lay of the feathers by alternating lowering an element into the body of water for causing the water to flow quickly upwardly relative to the fowls and raising it for causing the water to flow quickly downwardly relative to the fowls.

ALBERT W. BRUCE.